United States Patent [19]

Wray

[11] 3,838,447

[45] Sept. 24, 1974

[54] ANALOG INFORMATION STORAGE AND RETRIEVAL SYSTEM

[75] Inventor: William R. Wray, Brookline, Mass.

[73] Assignee: Polaroid Corporation, Cambridge, Mass.

[22] Filed: Oct. 2, 1972

[21] Appl. No.: 294,317

[52] U.S. Cl. .................. 360/26, 340/173 R, 360/25, 360/80

[51] Int. Cl. .......................... G11b 5/00, G06f 13/00

[58] Field of Search ........... 179/100.2 K, 100.2 MD; 178/6.6 A; 340/174.1 B, 173 R; 360/26

[56] References Cited

UNITED STATES PATENTS

| | | | |
|---|---|---|---|
| 2,679,187 | 5/1954 | Bitting, Jr. | 179/100.2 R |
| 2,892,900 | 6/1959 | Guttwein | 179/100.2 K |
| 3,017,616 | 1/1962 | Runyan | 340/174.1 B |
| 3,158,845 | 11/1964 | Bengston | 179/100.2 K |
| 3,347,997 | 10/1967 | Woodruff | 179/100.2 K |
| 3,395,355 | 7/1968 | Gabor | 328/72 |
| 3,445,832 | 5/1969 | Lecke et al. | 340/174.1 B |
| 3,483,540 | 12/1969 | Damron | 340/174.1 B |
| 3,490,013 | 1/1970 | Lawrance | 340/174.1 B |
| 3,510,857 | 5/1970 | Kennedy et al. | 340/174.1 B |
| 3,571,801 | 3/1971 | Coolidge et al. | 179/172.5 |
| 3,577,132 | 5/1971 | Anderson et al. | 340/174.1 A |
| 3,614,305 | 10/1971 | Hidaka | 179/100.2 K |
| 3,643,013 | 2/1972 | Lemoine | 179/100.2 K |

*Primary Examiner*—Alfred H. Eddleman
*Attorney, Agent, or Firm*—John W. Ericson

[57] ABSTRACT

An information storage and retrieval system in which an information signal is recorded on a record medium simultaneously with a pilot reference signal. A reproducing system is provided in which samples of the recorded information are read from the record into an analog storage register at a rate determined by the reproduced pilot signal, and read out of the analog storage register at a fixed rate to compensate for differences in the speeds at which the information is stored on, and retrieved from, the record.

13 Claims, 6 Drawing Figures

ANALOG INFORMATION STORAGE AND RETRIEVAL SYSTEM

This invention relates to information storage and retrieval, and particularly to a novel analog information storage and retrieval system in which the effects of differences in storage and retrieval speeds are reduced.

Storage of information on a record medium by sweeping a transducer over the record medium, and the subsequent retrieval of the information by sweeping another transducer over the record medium, usually result in variations in frequency between the recorded and reproduced signals because of instantaneous differences in the speed at which the recording and playback transducers are moved relative to the record medium. Such effects are commonly termed wow and flutter, and are commonly encountered in tape and disk recorders. Thus, one measure of the quality of a tape recorder is the degree to which these effects have been reduced by the attainment of precise and constant tape transport speeds.

A particularly onerous frequency deviation problem is encountered in the production of sound motion pictures for which the sound track is to be recorded on the film strip. The conflicting requirements for incremental film advance from frame to frame, and constant speed of the sound track relative to the playback head, are difficult to resolve without elaborate apparatus.

One approach to this problem is to provide an incremental drive for film advance at the projection station, and a separate constant speed film drive at a remote playback station. The projection and playback stations are separated by a relatively large loop of film, and synchronized in some fashion so that the loop maintains the same constant average length, within the limits required to preserve lip synchronization between the sound track and the photographic scene. This approach obviously involves a relatively complex drive and synchronization system.

It would obviously be highly desirable to reduce the requirements for speed uniformity on signal reproducing systems of the kind described, and a primary object of the invention is to do so. A more particular object of the invention is to facilitate the production of sound motion pictures of the kind in which the sound track is recorded on the film strip.

Briefly, the above and other objects of the invention are attained by a novel signal reproduction system in which a compensator is included that derives frequency deviation information from a recorded pilot signal, and uses this information to correct the frequency of the reproduced information signal so that the original recorded signal is recreated. For this purpose, a pilot clock pulse train is derived from the recorded pilot signal. The clock pulse train so produced comprises pulses at intervals that may differ, but which represent equal time intervals in the original recording process. These signals are used to gate samples of the reproduced information signal into an analog storage register.

A source of reference clock pulses is provided which consists of pulses at equal intervals that are in accordance with the intervals between the pilot clock pulses except for frequency shifts due to speed changes between the recording and reproduction that appear as variations in the duration between pilot clock pulses. These reference clock pulses are used to increment the address of a location in the storage register that is connected to an output terminal.

On the output terminal appears a signal representing the contents of one address in the signal register until the next reference clock pulse, whereupon the signal is changed to repeat the contents of the next storage location in the register. This output terminal is connected through a low pass filter to any desired utilization device, such as a loudspeaker or the like, where the originally recorded information is reproduced.

Because it is desired to keep the total number of storage locations in the analog storage register reasonably small, persistent speed errors, or very low frequency wow deviations in frequency, would tend to cause the read-in and read-out circuits to cross over in the memory, with the result that an information jump in time equivalent to the full contents of the storage register would occur, with an abrupt transition in the output that would represent a considerable distortion of the original signal. To prevent that occurrence, an address comparator is preferably employed to detect the approach of the input and output addresses and to omit either pilot clock pulses, or reference clock pulses, until the addresses regain at least a predetermined minimum separation. In addition, if desired, a speed control mechanism for the apparatus that drives the record relative to the playback transducer can be employed, so that such low frequency errors can be reduced or eliminated.

The manner in which the apparatus of the invention is constructed, and its mode of operation, will best be understood in the light of the following detailed description, together with the accompanying drawings, of various illustrative embodiments thereof.

In the drawings,

FIG. 2 is a schematic and fragmentary diagram of a modification of the system of FIG. 1;

Figures 1, 2, 3:
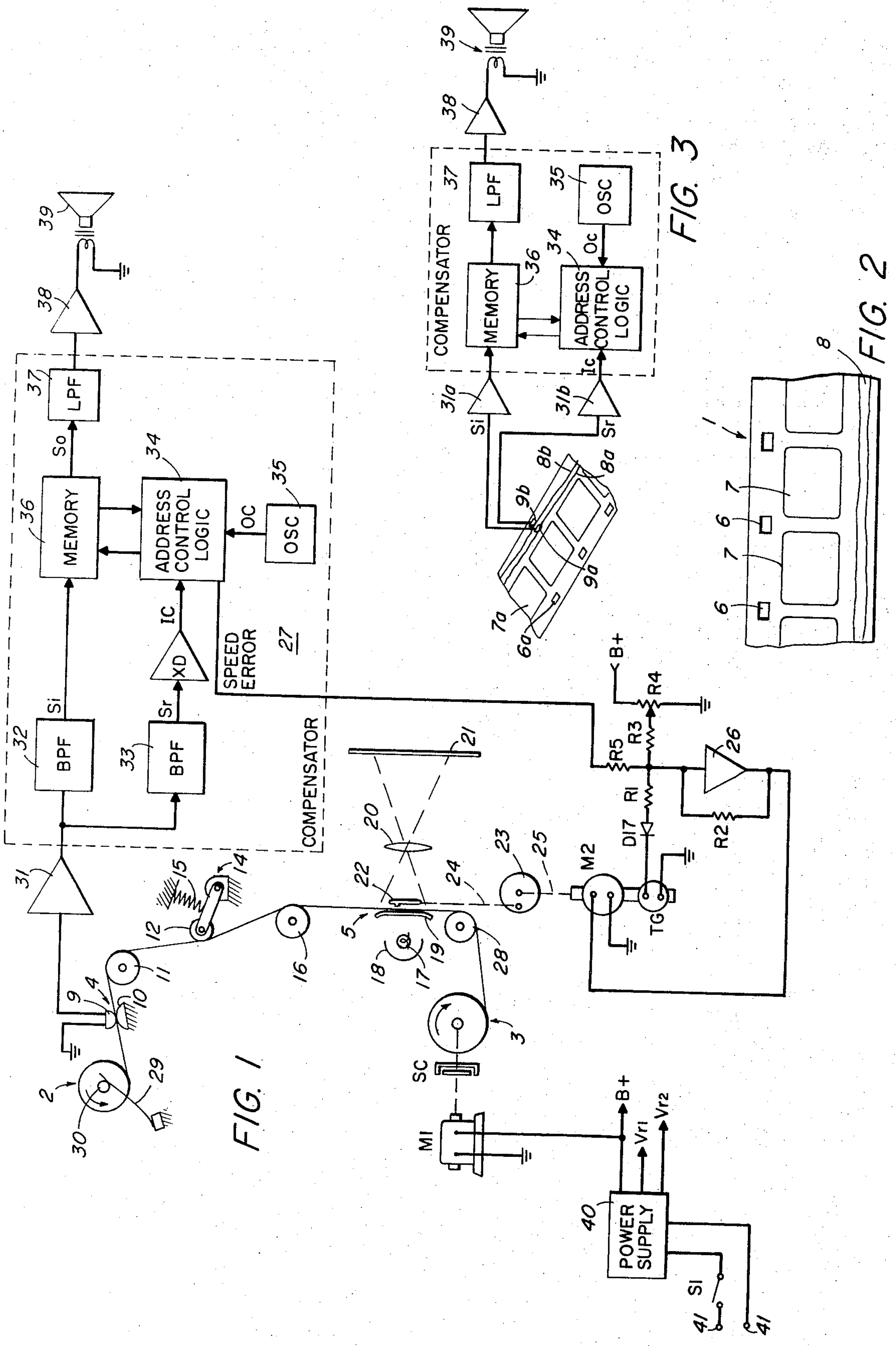
FIG. 1 is a schematic block and wiring diagram of a motion picture projection system in accordance with the invention.
FIG. 2 is a fragmentary elevational sketch, with parts broken away, showing schematically a sound motion picture film strip adapted for use in the system of FIG. 1.

Referring to FIG. 1, there is shown a motion picture projection system which may be of conventional construction except as specifically noted. In particular, a strip of motion picture film generally designated 1 is shown extending between a supply reel 2 and a takeup reel 3 over a path through a playback station generally designated 4 and a projection station generally designated 5.

Referring to FIG. 2, the film 1 is provided along at least one edge with a series of regularly spaced sprocket holes 6 that serve in a conventional manner to cooperate with incremental drive apparatus for allowing the film to be advanced a frame at a time past the projection station 5. On the film 1 are photographically recorded frames, each comprising a photographic transparency in a motion picture sequence, which frames are adapted to be viewed by intermittent projection in sequence.

Along at least one edge of the film 1 there is a strip of magnetic material generally designated 8, such as magnetic iron oxide or the like, on which a sound track can be recorded, preferably as the film is being exposed. Alternately, the sound track can be photographically recorded, and reproduced by photoelectric means.

The sound track 8 cooperates with a conventional electromagnetic playback head 9, of the electromagnetic type for magnetic recording. The head 9 is arranged to engage the track 8 at the playback station 4, and to be urged into light engagement with the surface of the film 1 for that purpose by means schematically indicated as a resilient pressure pad 10.

The film 1 extends from the supply reel 2 through the playback station 4 just described, and thence over a first idler roll 11, and against a bobulator roller 12 journaled for rotation to a lever 13. The lever 13 is pivoted to the frame of the apparatus as suggested at 14, and is resiliently urged toward the film 1 by a spring 15.

As a frame of film is taken by the film drive pawl in a manner to be described, the spring 15 may be compressed to allow the film path to be momentarily shortened. Thus, the motion of the film past the playback station 4 can be relatively uniform.

The film 1 next passes around a fixed idler 16 rotatably mounted on the frame in the conventional manner, not shown, and thence past the projection station 5. At the projection station 5, conventional projection apparatus is provided comprising a lamp 17 provided with a reflector 18 arranged to direct a beam of light through a suitable framing aperture, not shown, in a conventional pressure plate 19. The pressure plate 19 serves to locate the focal plane of the film 1. Light transmitted through the film passes through a conventional lens system, schematically indicated at 20, onto any convenient viewing screen schematically shown at 21.

The film is arranged to be incrementally advanced past the projection station by a conventional film drive mechanism, schematically shown as comprising a drive pawl 22 connected to a crank 23 as suggested at 24. The crank 23 is arranged to be rotated by a shaft 25 driven by a conventional motor M2.

As the shaft 25 rotates the crank 23, the pawl 22 is reciprocated and oscillated in a conventional manner to engage one of the sprocket holes 6 and advance the film by one frame length, and then disengage the film and return to the position for the next feed stroke in engagement with the subsequent sprocket hole 6. This operation will be familiar to those familiar with motion picture projectors, and need not be further described.

Preferably, the speed of the motor M2 is controlled by a speed control circuit that causes a conventional amplifier 26 to drive the motor at a film speed that will maintain the sound reproduced from the track 8 at the frequency at which it was recorded. For that purpose, a tachometer generator TG may be arranged to be driven by the shaft of the motor M2, and to provide a signal repeating the actual speed of the motor M2. This signal is rectified by a diode D17 and supplied through a summing resistor R1 to the input terminal of the amplifier 26. The amplifier 26 may be provided with a conventional feedback resistor R2.

A second summing resistor R3 supplies a signal component from a potentiometer comprising a variable resistor R4 connected between a DC supply terminal at a potential B+ and ground. The supply potential at B+ is present at this terminal, and at other points to be described, when a switch S1 is closed. The switch S1 supplies energy to a conventional power supply 40 from line terminals 41. The power supply 40 also produces reference potentials $Vr_1$ and $Vr_2$, for purposes to be described.

The potentiometer R4 has an adjustable wiper that can be positioned to cause the motor M2 to be driven at a predetermined fixed speed in the absence of an error in synchronization between the speed at which the original pictures were taken and the sound recorded and the speed at which they are being reproduced.

A speed error signal for that purposes is provided by a frequency compensator 27, to be described, and applied through a summing resistor R5 to the input terminal of the amplifier 26. This signal may be positive or negative depending on the departure of the motor speed from the correct speed.

The take-up reel 3 for the film 1 is arranged to be driven by a motor M1 through a slip clutch SC. The motor M1 may be a conventional DC motor arranged to be supplied with drive current from the supply terminal at B+. The fixed speed of the motor M1 is selected to be in excess of the maximum speed of the film 1 produced by the intermittent reciprocation of the pawl 22.

The film 1 extends from the projection station 5 over an idler 28 to the take-up reel 3. Tension on the film 1 is provided by a brake, schematically indicated as a resilient arm 29 engaging the hub 30 of the supply reel 2, as well as by frictional components introduced at the playback station 4, by the idlers 11, 16 and 28, by the bobulator roller 12, and by the pressure plate 19 at the projection station. These components are designed to be sufficient that the slip clutch SC will normally slip, with the film 1 remaining stationary at the projection station 5, except when the pawl 22 advances the film and allows a frame to be taken by the supply reel.

The film 1 will thus be relatively continuously moved past the playback station 4 at a more or less uniform speed, and will be incrementally advanced at the projection station, with concommitant motion of the bobulator roll 12 to vary the film path length with these incremental film advance strokes so that the average speed at the playback station can be maintained. The film will be taken up on the take-up reel 3 as it is advanced by the pawl 22.

It will be apparent that perfect isolation between the playback station and the projection station cannot be obtained by the mechanism just described. In particular, a strong flutter frequency component at the film projection rate, for example, from 18 to 24 cycles per second, will be introduced in this manner. Other wow and flutter components will also be present. These factors are removed by the compensator 27 in a manner next to be described.

The playback head 9 is connected between ground and the active input terminal of a conventional preamplifier 31. The active output terminal of the amplifier 31 is connected in parallel to two band pass filters 32 and 33. The sound signal for the film may be recorded in a band from, for example, 100 Hz to 6,000 Hz for reasonably good fidelity. A pilot tone comprising a constant signal at 7,500 Hz may be recorded on the same track 8.

The filter 32 is arranged to pass the sound signals in the range from 100 to 6,000 Hz, and the filter 33 has a pass band sufficient to accommodate the 7,500 cycle pilot tone and its frequency deviations that may be introduced by wow and flutter, and particularly the strong component introduced by the intermittent motion of the film at the projection station 5.

The output signal from the filter 33, labeled S*r* in FIG. 1, is supplied to a zero crossing detector XD, of any conventional construction, which preferably produces an output pulse at each zero crossing of the reference signal S*r*, and accordingly produces a train of clock pulses IC at the rate of 15,000 per second. These clock pulses IC are applied to address control logic circuits schematically indicated at 34 and to be described in more detail below.

A fixed train of clock pulses OC is provided by local oscillator 35. The oscillator 35 may have a fixed repetition rate of 15,000 cycles per second, equal to the nominal repetition rate of the clock pulses IC. These pulses OC are also supplied to the address control logic circuits 34, for purposes to be described.

The uncorrected audio signal S*i* from the band pass filter 32 is supplied to an analog memory 36, shown in block form in FIG. 1, and to be described in more detail below. The address control logic circuits 34 direct the entry of samples of the signal S*i* into the memory 36 in time with the clock pulses IC, and produce an output signal S*o* that is changed in time with the clock pulses OC. As the several stages of the memory are entered by the samples S*i*, they are taken out in sequence to sequentially determine the amplitude of the signal S*o*.

Feedback from the memory 36 to the address control logic circuits 34 is provided, in a manner that will be described. Should the pulses IC that read samples into the memory be too much faster or too much slower in arriving than the pulses OC, this feedback control provides for the dropping of one or more of the clock pulses IC or OC so that crossover in the memory does not occur.

The output signal S*o* from the memory is an analog signal that remains essentially constant between clock pulses OC and then changes to a new value at each pulse OC. This signal is supplied through a low pass filter 37 to a conventional audio amplifier 38 that actuates a loudspeaker 39, or other desired utilization device.

If desired, a harmonic of the refernece signal S*r* may be used to generate the clock pulses. For example, following the band pass filter 33, a fifth harmonic selector could be incorporated to generate and selectively apply the fifth harmonic of the reference signal to the zero crossing detector XD. That would produce clock pulses IC at a considerably higher rate, and thus improve the fidelity of the output signal by increasing the sampling rate. A corresponding increase in the frequency of the oscillator producing the clock pulses OC would be necessary for this purpose.

FIG. 3 shows a modification of the apparatus of the invention in which band pass filtering is not required, and in which the recorded information signal can occupy a band including the frequency of the reference signal. Specifically, a film strip 1*a* may otherwise be the same as that shown at 1 in FIG. 2, except that two sufficiently spaced magnetic recording tracks 8*a* and 8*b* are provided. An information signal S*r* is recorded on one of the tracks and reproduced by a head 9*a*. The reference signal is recorded on a spaced track 8*b*, and reproduced by a playback head 9*b*.

The reproduced signals are applied to amplifiers 31*a* and 31*b*, respectively, to provide the information signal S*i* and reference signal S*r* in the same manner and for the same purposes described above in connection with FIG. 1. Since these signals are recorded on separate tracks of the film, they may be physically rather than electronically isolated. The apparatus may otherwise be described above in connection with FIG. 1. If the recorded pilot reference frequency is in the information signal band, it should be multiplied, as by harmonic generation in the manner discussed above, to provide a sampling rate that is at least twice the highest information frequency.

Figure 4:
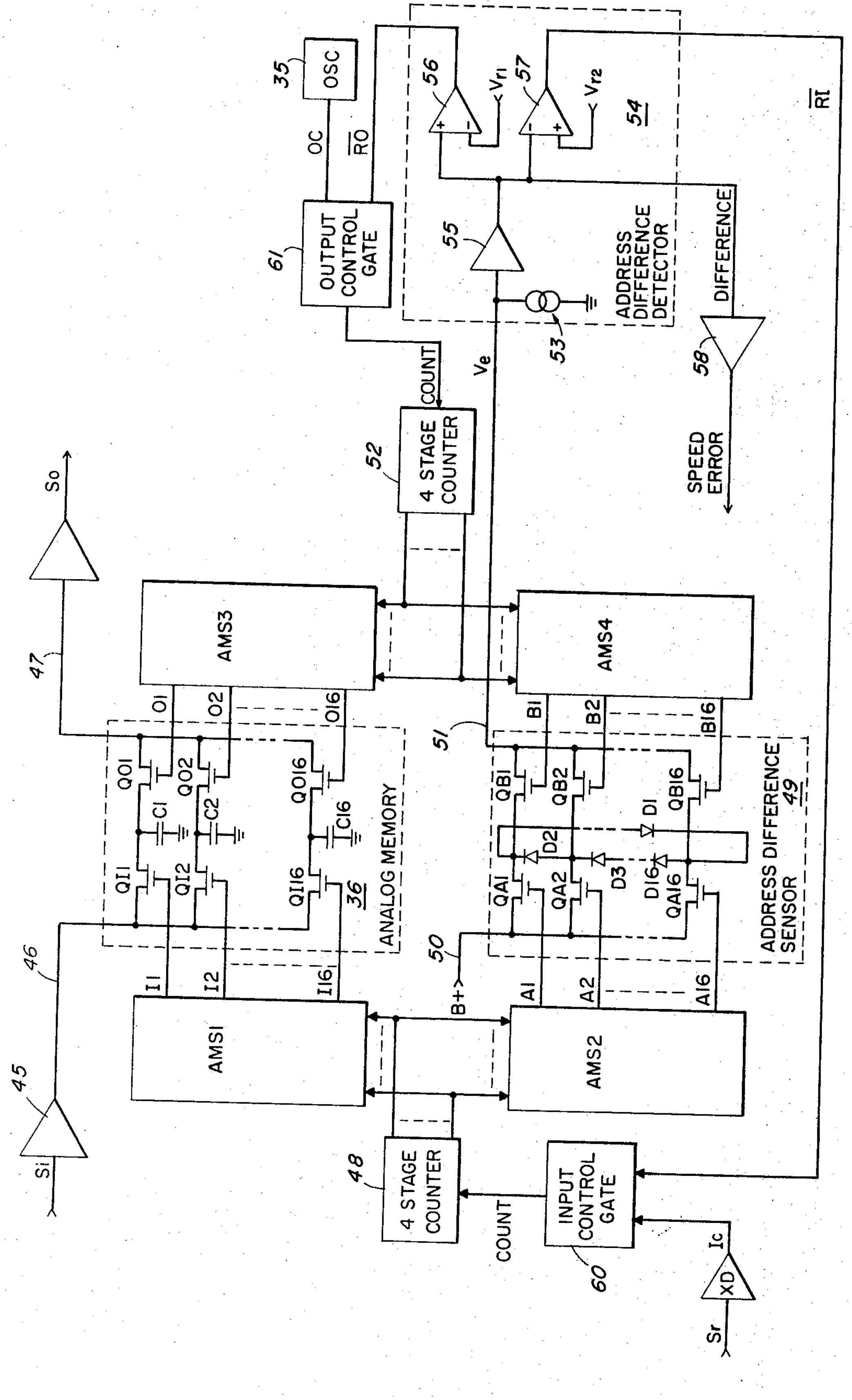
FIG. 4 is a schematic block and wiring diagram of an analog memory, and an address control system therefor, suitable for use in the apparatus of FIGS. 1 or 3.

FIG. 4 shows the analog memory and its address control circuits in more detail. The memory 36 may be a 16 stage capacitor memory addressed by field effect transistors and selected from those conventionally available units using field effect transistors manufactured by conventional MOS techniques.

The information signal S*i* is supplied through a conventional voltage following amplifier 45 to a lead 46. A sample of the signal on the lead 46 may be stored in any of a set of capacitors C1 through C16 in dependence on which one of a set of electronic switches, here shown as a set of 16 field effect transistors, designated QR1, QR2, etc., through QR16 is conducting. One of the transistors is selected by application of a logic 1 signal on one of a set of 16 address leads I1 through I16 to the base of the transistor to gate it into conduction and thereby supply a charging path from the lead 46 to the capacitor so selected.

A signal comprising the sample stored on any one of the capacitors C1 through C16 may be applied to an output lead 47 when the load terminals of a corresponding output switch, shown as a set of field effect transistors Q01, Q02, etc., through Q016 are rendered conductive. That is accomplished by the application of an output gate signal at logic 1, on one of a set of leads 01 through 016, applied to its base terminal.

The input address selection signals I1 through I16 are supplied by a conventional analog multiplex switch AMS1, of any conventional design, arranged to apply a logic 1 signal to one of the 16 output terminals I1 through I16 in response to a different one of a set of 16 digital codes on a set of four input leads and supplied from the output terminals of a four-stage binary counter 48. The counter 48 is successively advanced through its 16 states by each of a series of applied count pulses, and thus sequentially addresses the 16 stages of the memory in a cyclic sequence.

The output terminals of the counter 48 also drives a second analog multiplex switch AMS2 in synchronism with the switch AMS1. The switch AMS2 provides 16 output leads A1 through A16 which are connected to the bases of a set of 16 field effect transistors QA1 through QA16 in an address difference sensor 49.

Each of the transistors QA1 through QA16 is associated with a different one of a second set of 16 field effect transistors QB1 through QB16, and has one load terminal connected to a lead 50 on which the supply voltage at the potential B+ appears. Each of the transistors QA1 through QA16 has a second load terminal connected to one load terminal of an associated transistor QB1 through QB16. A second load terminal of each of the transistors QB1 through QB16 is connected to a lead 51, upon which a signal labeled V*e*, to be described below, appears.

A diode ring, comprising 16 diodes D1 through D16, interconnects the common junctions of the transistor pairs AQ and QB. Specifically, a diode D1 has its anode connected to the interconnected load terminals of the transistors AQ1 and QB1, and its cathode connected to the interconnected load terminals of the transistors QA16 and QB16. Similarly, a diode D2 has its anode connected to the interconnected load terminals of the transistors QA2 and QB2, and its cathode connected to the interconnected load terminals of the transistors QA1 and QB1, and so on.

The signals 01 through 016, one and only one of which is always at logic 1 to select one of the transistors Q01 through Q016 for conduction, are provided by a conventional analog multiplex switch AMS3, and the energized one of the output leads 01 through 016 is selected by the digital code appearing on the four output terminals of a four stage binary counter 52. The output terminals of the counter 52 are also connected to an analog multiplex switch AMS4, which produces a logic 1 signal on one and only one of 16 leads B1 through B16 in response to the current state of the counter 52. The counter 52 is sequentially cycled through its 16 states by count pulses applied to its input terminal.

In the operation of the apparatus, one of the transistors QI1 through QI16, and a correspondingly numbered one of the transistors QA1 through QA16, is always conducting. Similarly, one of the transistors Q01 through Q016, and a correspondingly numbered one of the transistors QB1 through QB16, is always conducting.

The conducting one of the input transistors QI selects the memory location into which information is to be entered from the lead 46. The energized one of the output transistors Q0 selects the storage location from which information is to be read out onto the lead 47.

Thus, the conducting one of the transistors QA1 through AQ16 identifies the input address, in the memory 36, and the conducting one of the transistors QB1 through QB16 identifies the output address in the memory 36. It is desired to keep these addresses apart, so that data entry does not overtake data output, or data output overtake data entry, to prevent the occurrence of a memory crossover.

The memory address difference sensor 49 provides a signal that permits this control to be accomplished. Specifically, a circuit path extends from the supply terminal at B+ over the lead 50 and through the conducting one of the transistors QA, and thence through one or more of the diodes D1 through D16 in the forward conducting direction, out through the conducting one of the transistors QB to the lead 51, and thence to ground through a conventional constant current source 53, in a functional unit identified by a dotted outline as an address difference detector 54. The voltage on the lead 51 is thus essentially B+ less the number of forward drops that are represented by the number of diodes between the load terminal of the conducting transistor QA and the load terminal of the conducting transistor QB. The constant current source 53 is included because the voltage drop through a diode in the forward direction is a function of the current through the diode. It is desired to have these drops constant regardless of the number of conducting diodes in the current path.

As an example, suppose that information was being read into address 2 and out of address 16. Thus, transistors QI2, Q016, QA2 and QB16 would be conducting. The sensing circuit path would thus extend from the lead 50 through the load terminals of transistor QA2, through the diodes D2 and D1 in series, and through the load terminals of the transistor QB16 to the output lead 51. Two forward diode gaps, in addition to two field effect transistor load terminal gaps, would thus separate the potential of the lead 51 from the supply potential at B+. If the output address was changd from 16 to 1, transistors Q01 and QB1 would be rendered conducting, and in that case only the diode D2 would separate the potential supplied by the transistor QA2 from the potential received by the output transistor QB1.

The address difference signal V*e* appearing on the lead 51 is applied to a buffer amplifier 55. The output signal from the amplifier 55 is applied to a first voltage comparator comprising an operational amplifier 56. The signal from the amplifier 55 is applied to the non-inverting input terminal of the amplifier 56.

A first reference voltage $Vr_1$, from any suitable source of reference potential, that is slightly less than one forward diode gap less than the supply potential at B+, is applied to the inverting input terminal of the amplifier 56. The amplifier 56 is arranged to produce a log 1 signal labeled $\overline{RO}$ when the diode path from the selected input transistor QA that is currently conducting to the output transistor QB that is currently conducting is one forward diode gap or less. If there are more diodes in this path, the signal from the amplifier 56 will be zero.

For example, if the input address was 2, with transistor QA2 conducting, and the output address was 1, 2 or 16, it would be desired to hold the output address while the input address advances to prevent a crossover. Under these conditions, the signal RO would be produced.

The signal from the amplifier 55 is also applied to the inverting input terminal of a second operational amplifier 57, which also serves as a comparator, in this case serving to produce a signal that is at a logic 1 level, labeled $\overline{RI}$, when there are at least 15 diode forward gaps between the conducting transistor QA and the conducting transistor QB. For this purpose, a second reference voltage $Vr_2$ is applied to the non-inverting input terminal of the amplifier 57. When the signal $\overline{RI}$ is produced, the input address is not allowed to advance until the output address has been advanced to remove the signal $\overline{RI}$.

The voltage at the output of the amplifier 55 represents the difference between the input and output addresses in terms of a voltage which fluctuates between a value proportional to B+ minus one forward diode gap to a value proportional to B+ minus 15 forward diode gaps. This difference signal is applied to a conventional amplifier 58 to provide a speed error signal that is bipolar and properly scaled to adjust the speed of the motor M2 in FIG. 1 in a direction to tend to maintain the address difference at the central point in the allowable range.

The signal $\overline{RI}$, together with the clock pulses IC from the zero crossing detector XD, are applied to an input control gate 60 which provides COUNT pulses, in a stream corresponding to the clock pulse stream IC, except that when a signal RI is present, a pulse is deleted from the count pulse stream. The input control gate 60 will be described below in more detail in connection with FIG. 5.

Similarly, the signal $\overline{RO}$ from the address difference detector 54 is supplied to an output control gate 61, together with the clock pulses OC from the oscillator 35. The control gate 61 supplies COUNT pulses to the counter 52, one for each pulse OC, except that when the signal $\overline{RO}$ is present, a pulse is deleted from the COUNT pulse stream.

Figure 5:
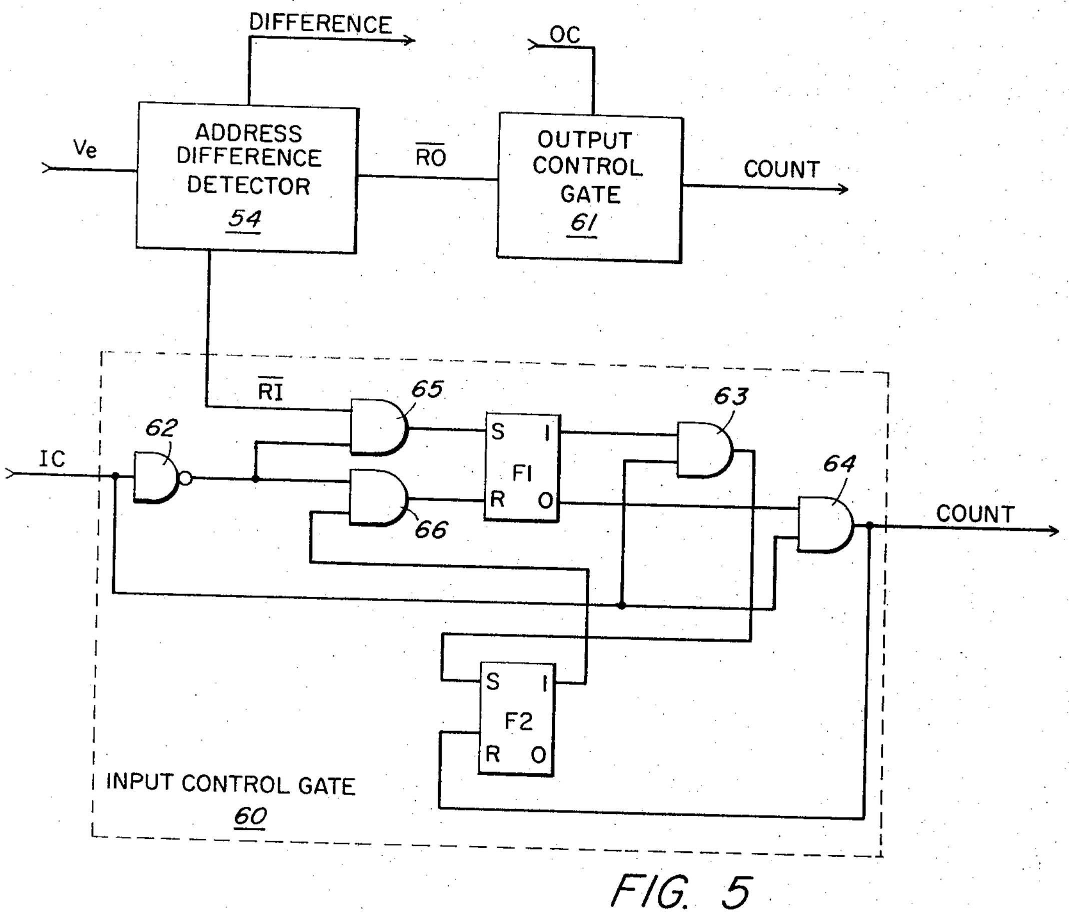
FIG. 5 is a schematic block and wiring diagram of portions of the control circuit shown in block form in FIG. 4.

FIG. 5 shows the details of the input control gate 60. The output control gate 61, which may be identical in construction, may be assumed to operate in the same manner as will be described for the gate 60.

As shown, the clock pulses IC are applied to a conventional NAND gate 62, which serves as in inverter. and to one input terminal of each of two conventional AND gates 63 and 64. The gate 62 thus produces a logic 1 output signal at its output terminal when, and only when, the clock pulses IC are absent. The gates 63 and 64 produce logic 1 output signals when a clock pulse is present and their second input terminals, connected in a manner to be described, are at logic 1.

The output signal from the gate 62 is applied to one input terminal of each of two AND gates 65 and 66. The second input terminal of the gate 65 receives the signal $\overline{RI}$ from the difference detector 54. The second input terminal of the gate 66 is connected to the logic 1 output terminal of a conventional flip-flop F2. This terminal is at a logic 1 level when the flip-flop F2 is set in a manner to be described.

When the gate 65 produces a logic 1 output signal, a flip-flop F1 is set. When set, a logic 1 signal appears at the logic 1 output terminal of the flip-flop F1 to enable the gate 63, so that the gate 63 will produce a logic 1 output signal at the next clock pulse IC. This logic 1 signal from the gate 63 sets the flip-flop F2.

A logic 1 output signal at the logic 1 output terminal of the flip-flop F2 enables an AND gate 66 to reset the flip-flop F1 when the clock pulse that caused the flip-flop F2 to be set disappears.

The logic zero output terminal of the flip-flop F1 is connected to the second input terminal of the gate 64. Thus, when the flip-flop F1 is reset, and a clock pulse IC appears, a COUNT pulse is produced. This COUNT pulse is applied to reset the flip-flop F2.

Figure 6:
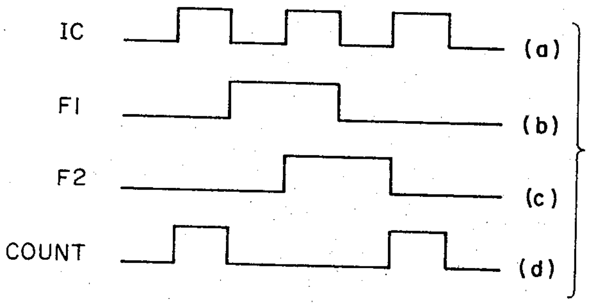
FIG. 6 is a composite timing diagram illustrating the operation of a portion of the apparatus of FIG. 5.

Referring to FIG. 6, a typical operating sequence is shown, which assumes that both flip-flops F1 and F2 are reset, and that the signal $\overline{RI}$ is initially absent. The states of the flip-flops are represented as low when they are reset, and high when they are set, in FIGS. *6b* and *6c*. The clock pulses IC, and the COUNT pulses, are shown as high when present and as low when absent.

As the first clock pulse IC is produced with the flip-flop F1 reset, the gate 64 produces a COUNT pulse. Assume that this COUNT pulse causes the address difference detector 54 to produce the signal $\overline{RI}$. When the block pulse IC disappears, the gate 65 will accordingly set the flip-flop F1, enabling the gate 63 and disabling the gate 64.

When the next pulse IC appears, the gate 64 will not produce a COUNT pulse, but the gate 63 will produce a logic 1 output signal to set the flip-flop F2. As a COUNT pulse has been omitted, and because the input clock and output clock frequencies are maintained relatively close together, an output COUNT pulse will occur sometime during the interval between the end of the first clock pulse IC and the end of the second clock pulse IC. That will cause the signal $\overline{RI}$ to disappear.

Assume that the next clock pulse OC occurs before the end of the second clock pulse IC. That will cause the level $\overline{RI}$ to be removed, disabling the gate 65. When the pulse IC disappears, with the flip-flop F2 set, the gate 66 will reset the flip-flop F1. The gate 64 will then be enabled.

The next clock pulse IC will thus be passed by the gate 64 as a COUNT pulse, and this COUNT pulse will reset the flip-flop F2. It is apparent that the result is to delete a COUNT pulse in response to the presence of the signal $\overline{RI}$. The output control gate 61 may be connected in an identical manner, to delete output COUNT pulses in response to the presence of the signal $\overline{RO}$.

While the invention has been described primarily with respect to the details of a particular motion picture sound system, it will be apparent to those skilled in the art that the apparatus is adaptable to the correction of frequency deviations in other analog information storage and retrieval systems, and in other frequency domains. The only requirements are that the information contained in the signals to be compensated be somewhat redundant, as control is affected by discarding samples, or by repeating samples, in order to keep the size of the memory down. The sampling rates must be high enough to allow this to be done without noticeably distorting the output. Within these limitations, it will be apparent that the invention has wide application to the correction of frequency deviations in reproducing recorded signals.

The overall operation of the system of the invention will in general be apparent from the above description. However, referring to FIG. 1, operation of the system will be briefly reviewed. It is assumed that a strip of movie film 1 of the type shown in FIG. 2, on which a series of photographic transparency frames 7 have been photographed and developed, and on which a sound track 8 has been recorded with the sound to accompany the pictures and the reference tone described, is threaded between the supply reel 2 and the takeup reel 3. Next, assume that the switch S1 is closed to supply power at the potentials B+, $Vr1$ and $Vr2$ to the apparatus.

The motor M1 will commence to run, with attendant slippage of the clutch SC to apply tension to the film 1. The motor M2 will operate, with its speed under the control of the speed error signal from the compensator 27 applied to the control network for the amplifier 26. The speed of the film will accordingly be maintained near the desired average value.

The crank 23 will cause the pawl 22 to intermittently advance the film, resulting in an average speed at the playback station 4 that will fluctuate by a flutter component. The reproduced audio signal will be supplied through the amplifier 31 to the filters 32 and 33 in the compensator 27.

Samples of the information signal $Si$ will be read into the memory 36 under the control of the clock pulses IC, at the rate at which zero crossings in the reference signal are read back from the tape. Samples will be read out of the memory to form the output signal SO, which will be changed at the rate of the clock pulse OC from the oscillator 35, at a rate centered in the range of the rates of occurrence of the pulses IC.

When the pulses IC occur more rapidly than the pulses OC, the input memory address will move closer to the output memory address, until the detection point at which the comparator 57 in FIG. 4 is actuated to produce the signal $\overline{RI}$. That will cause sampling in to be interrupted. In effect, an input sample will be discarded to allow the output to catch up.

On the other hand, if the input pulses occur more slowly than the output pulses, the input address will move toward the output address in the opposite direction, until the comparator 56 in FIG. 4 responds to produce the signal $\overline{RO}$. That will inhibit the change of the output memory address for one count, allowing the input address sampling to catch up. Since the input samples are, at times corresponding to equal time intervals during recording, and the output samples are taken at the constant intervals established by the output clock pulses, the information will be restored to the original recorded frequency, except as it is temporarily rephased as the memory tends to overflow in either direction.

It has been found by experiment that a 16 stage memory compensates for fairly extreme conditions of violent flutter such as those encountered in a movie projector at 18 frames per second without distortion appreciable to the ear. The output signal So applied through the low pass filter 37 and the amplifier 38 to the loud speaker 39 will accordingly produce the recorded frequency accurately. And a particular advantage of the system is that, by relaxing the requirements on the uniformity of the film speed at the playback head, the bobulator roller 12 can effect sufficient isolation between the playback station and the projection station with only small changes in the length of the film path between those stations. Accordingly, lip synchronization is preserved without any additional apparatus.

While the invention has been described with respect to the details of various illustrative embodiments, many changes and variations will occur to those skilled in the art in reading this description. Such can obviously be made without departing from the scope of the invention.

Having thus described the invention, what is claimed is:

1. In combination with a memory having a plurality of addressable storage locations, first means for addressing said storage locations in a predetermined cyclic sequence at a first rate, second means for addressing said storage locations in said predetermined cyclic sequence at a second rate, sensing means responsive to said first and second means for sensing the distance in said sequence between the locations addressed by said first and second means, and means controlled by said sensing means for selectively inhibiting the operation of said first means and said second means to maintain said distance in a predetermined range.

2. In combination, an analog storage register comprising a set of storage means, an input terminal, an output terminal, first switching means selectively operable to connect said input terminal to any of said storage means, second switching means selectively operable to connect any of said storage means to said output terminal, input address control means cyclically operable in response to a first series of applied signals to operate said first switching means to sequentially connect said input terminal to each of said storage means in a cyclic ordered sequence, output address control means cyclically operable in response to a second series of applied signals to operate said second switching means to sequentially connect said output terminal to each of said storage means in said cyclic ordered sequence and signal generating means controlled by said input and output address control means for producing a signal in accordance with the distance in said sequence between the storage means connected to said input terminal and the storage means connected to said output terminal.

3. The apparatus of claim 2, in which said signal generating means comprises a set of diodes, one for each of said storage means, means connecting said diodes in series aiding relationship in a closed series path so that there is a one-to-one correspondence between said storage means and the junctions of said diodes, sensing means comprising a pair of terminals and means responsive to an electrical characteristic of the path between said terminals for producing a signal in accordance with said characteristic, third switching means actuated by said input address control means for connecting one of said terminals to the junction between said diodes corresponding to the storage means connected to said input terminal, and fourth switching means actuated by said output address control means for connecting the other of said terminals to the junction between said diodes corresponding to the storage means connected to said output terminal.

4. Compensating means, comprising means for simultaneously reproducing an information signal and a reference signal from a record on which the signals have been simultaneously recorded, a sequence of addressable storage locations, input sampling means settable to first and second states and responsive to said signals in its first stage for storing samples of said reproduced information signal in said memory in a cyclic ordered sequence of said storage locations at a rate determined by the frequency of said reproduced reference signal, an output terminal, output signal producing means settable to first and second stages and effective in its first state to apply samples from said memory to said output terminal at a constant rate from storage locations addressed in said cyclic ordered sequence, means controlled by said input sampling means and said output signal producing means for setting said input sampling means to its first or its second state according as the difference between the number of samples stored in said memory and the number of different samples applied to said output terminal does not or does exceed a predetermined positive number, respectively, and means controlled by said input sampling means and said output signal producing means for setting said output signal generating means to its first or its second state according as said difference does not or does exceed a predetermined negative number, respectively.

5. In combination, transducer means for reproducing from a record an information signal and a reference signal recorded on the record, an addressable memory, sampling means controlled by said transducer means for storing samples of a reproduced information signal in said memory in a cyclic ordered sequence of addresses at a rate determined by the frequency of a reproduced reference signal, an output terminal, output signal producing means for sequentially supplying output signals to said output terminal from said ordered sequence of addresses at a constant rate, means controlled by said sampling means and said output signal producing means for producing a control signal in accordance with the difference between the addresses at which samples are being stored and supplied to said output terminal, respectively, means responsive to said control signal for inhibiting the operation of said sampling means when the number of samples stored in said memory exceeds the number of samples supplied to said output terminal by a predetermined amount, and means responsive to said control signal for inhibiting the operation of said output signal producing means when the number of samples applied to said output terminal exceeds the number of samples stored in said memory by a predetermined amount.

6. In a compensator for reducing frequency shifts in an information signal with the aid of a reference signal that has experienced the same frequency shifts from an initially predetermined frequency, a memory, first means for entering samples of the information signal into successive locations in said memory at a rate determined by the frequency of the reference signal, an output terminal, second means for applying samples from said successive locations in said memory to said output terminal at a rate determined by said predetermined frequency, and means responsive to the difference between the locations in said memory in which samples are being entered and the locations from which samples are being applied to said output terminal for inhibiting the operation of said first means or said second means according as the locations at which samples are being entered approach the locations from which samples are being applied to said output terminal or conversely, respectively.

7. In combination, a memory, sampling means responsive to an applied information signal and controlled by an applied reference signal for storing samples of said information signal in said memory at a cyclic ordered sequence of addresses at a rate determined by the frequency of said reference signal, output signal producing means for extracting samples stored in said memory from said cyclic ordered sequence of addresses at a constant rate, address difference detecting means responsive to the difference between the storage and extraction addresses for inhibiting the operation of said sampling means or said output signal producing means according as said storage address is overtaking said extraction address, or conversely, respectively.

8. In combination, transducer means for simultaneously reproducing an information signal and a reference signal from a record moving relative to said transducer means, said signals being reproduced at frequencies dependent on the speed of said record relative to said transducer means, first filter means connected to said transducer means for selectively producing said reproduced information signal, second filter means connected to said transducer means for selectively producing said reproduced reference signal, an analog storage register comprising a predetermined number of storage means, first switching means connected to said first filter means and selectively operable to apply said reproduced information signal to any one of said storage means, first cyclically operable means responsive to a series of applied signals to operate said first switching means to sequentially apply said information signal to each of said storage means in a cyclic ordered sequence, an output terminal, second switching means operable to connect any one of said storage means to said output terminal, second cyclically operable means responsive to a series of applied signals to sequentially connect each of said storage means to said output terminal in said cyclic ordered sequence, sensing means responsive to the relative locations in said sequence of the storage means connected to said first filter means and the storage means connected to said output terminal for producing a control signal indicative of said difference, means connected to said second filter means and said sensing means for applying signals to said first cyclically operable means at a rate determined by the frequency of said reproduced reference signal when said difference is in a first range, and means controlled by said sensing means for applying signals to said second cyclically operable means at a constant rate when said difference is in a second range.

9. A frequency compensator, comprising reproducing means for simultaneously reproducing an information signal and a reference signal from a record, memory means comprising a plurality of storage locations, sampling means controlled by said reproducing means for sequentially storing samples of said reproduced information signal in said storage locations at a rate determined by the frequency of said reproduced reference signal, output signal producing means for producing a signal sequentially determined by the contents of said storage locations at a constant rate, means for sensing the approach of the locations in which samples are stored by said sampling means to the locations determining said output signal for interrupting the operation of said sampling means to prevent a crossover in the memory when the sampling rate exceeds said constant rate, and means for sensing the approach of the locations determining said output signal to the locations in which samples are stored by said sampling means for interrupting the operation of said output signal producing means to prevent a crossover in the memory when said constant rate exceeds the sampling rate.

10. Means for reproducing an analog signal recorded on a record simultaneously with a constant frequency pilot signal, comprising transducer means, drive means for moving the record relative to said transducer means to cause said transducer means to reproduce the recorded signals, an input terminal, an output terminal, a series of addressable analog storage means, means connecting said transducer means to said input terminal to apply said reproduced analog signal to said input terminal, input addressing means connected to said transducer means and responsive to said reproduced pilot signal for sequentially addressing said storage means from said input terminal to store samples of said analog signal in said storage means at a rate determined by the frequency of said reproduced pilot signal, a constant frequency oscillator, output addressing means controlled by said oscillator for sequentially addressing said output terminal from said storage means at a rate determined by the frequency of said oscillator to produce an output signal determined by the stored samples, and address difference detecting means responsive to the difference between the input and output addresses for interrupting the operation of said input addressing means or said output addressing means according as said input address is about to overtake said output address, or conversely, respectively.

11. The apparatus of claim 10, further comprising means responsive to said address difference detecting means for controlling said drive means to move the record relative to said transducer means at a speed at which the average frequency of said reproduced pilot signal equals the frequency at which the pilot signal was recorded.

12. The apparatus of claim 10, in which said address difference detecting means comprises a set of diodes, one for each of said storage means, said diodes being connected together in series aiding relationship in a closed series path so that there is a one-to-one correspondence between said storage means and the junctions between said diodes, first and second sensing terminals, means responsive to the voltage between said terminals for producing a control signal determined by said voltage, means controlled by said input addressing means for connecting said first sensing terminal to junctions between said diodes corresponding to the storage means addressed by said input addressing means, means controlled by said output addressing means for connecting said second sensing termainl to junctions between said diodes corresponding to the storage means addressed by said output addressing means, and means responsive to said control signal for interrupting the operation of said input addressing means or said output addressing means according as said control signal is in a first or a second range, respectively.

13. Apparatus for correcting phase shifts in an analog signal with the aid of a reference signal having corresponding phase shifts from a predetermined frequency, said apparatus comprising, an input terminal, an output terminal, a bank of capacitors, first switching means cyclically operable in response to a train of applied signals to selectively connect each of said capacitors to said input terminal in a cyclic ordered sequence to store voltages corresponding to samples of the voltage on said input terminal, second switching means cyclically operable in response to a train of applied signals to selectively connect each of said capacitors to said output terminal in said cyclic ordered sequence to produce a voltage on said output terminal corresponding to the voltages stored by the capacitor, means for applying the analog signal to said input terminal, first signal generating means for receiving the reference signal and producing a train of signals at a rate determined by the frequency of the reference signal, second signal generating means for producing a train of signals at a constant rate, a set of diodes, one for each capacitor, said diodes being connected together in series aiding relationship in a closed series path so that there is a one-to-one correspondence between the junctions of said diodes and the capacitors, first and second sensing terminals, sensing means connected to said sensing terminals for producing a control signal determined by the voltage between said terminals, means controlled by said first switching means for connecting said first sensing terminal to the junction between said diodes corresponding to the capacitor to which said input terminal is connected, means controlled by said second switching means for connecting said second sensing terminal to the junction between said diodes corresponding to the capacitor to which said output terminal is connected, first gating means connected to said first signal generating means and enabled by said control signal in a first range thereof for applying the signals from said first signal generating means to said first switching means when enabled, and second gating means enabled by said control signal in a second range including a portion of said first range and connected to said second signal generating means for applying the signals produced by said second signal generating means to said second switching means when enabled.

* * * * *